April 29, 1952 G. B. BAILEY 2,594,716
ELECTRONIC PROGRAM CONTROLLER
Filed May 22, 1948
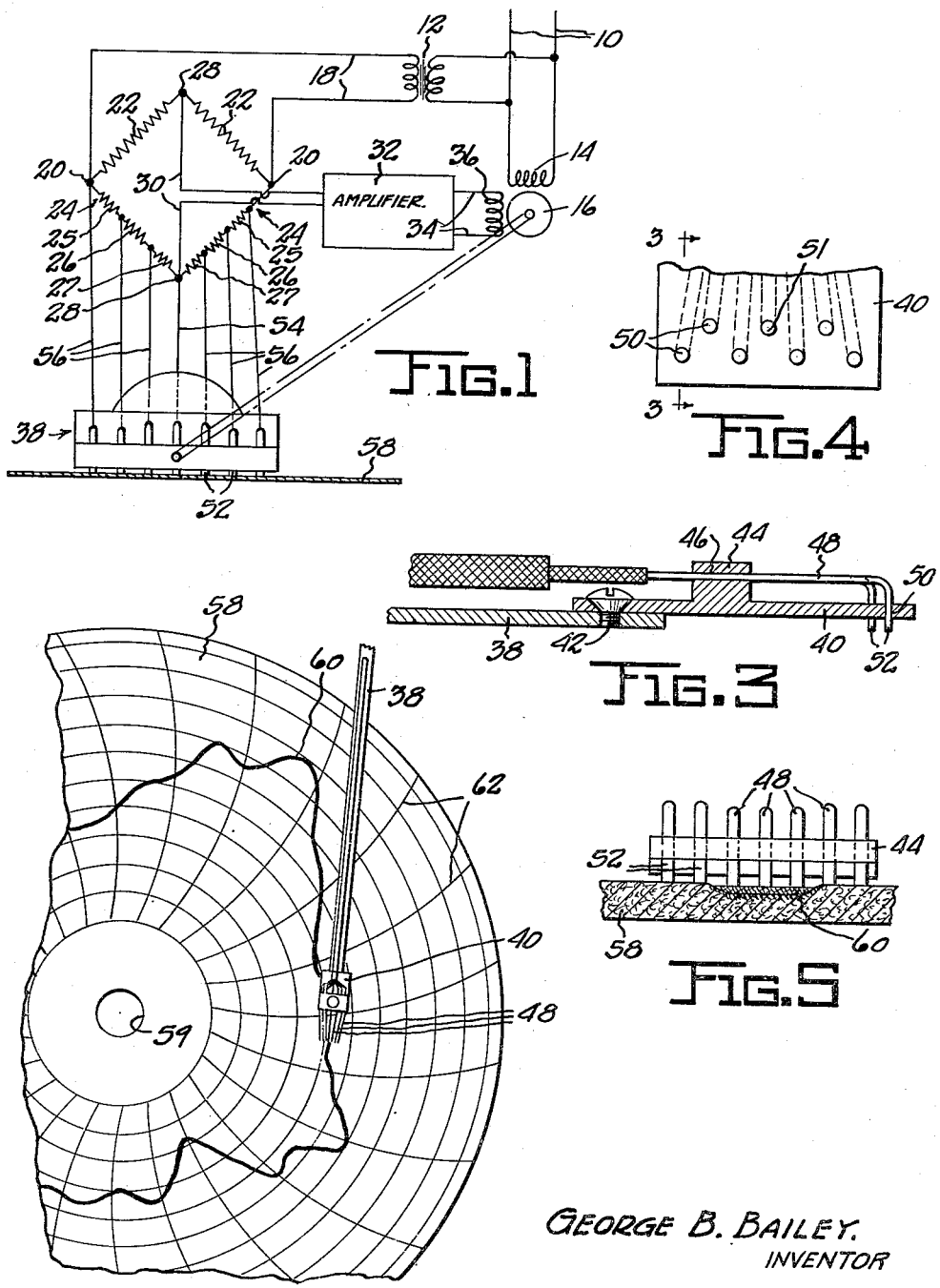
GEORGE B. BAILEY,
INVENTOR
BY Oltsch + Knoblock.
ATTORNEYS Patented Apr. 29, 1952

2,594,716

UNITED STATES PATENT OFFICE 2,594,716

ELECTRONIC PROGRAM CONTROLLER

George B. Bailey, Long Beach, Ind., assignor to The Hays Corporation, Michigan City, Ind., a corporation of Indiana Application May 22, 1948, Serial No. 28,662

16 Claims. (Cl. 318—31)

This invention relates to improvements in electronic program controllers, and particularly to a device which may be used to control the sequence in which a series of operations is performed or in which settings of a driven device or device to be controlled are adjusted according to a predetermined pattern or guide. Devices of this character are adaptable for many uses including the successive operation of a plurality of control elements, such as valves, switches or the like, in an industrial process or machine.

The primary object of the invention is to provide a novel and simple device of this character which is accurate and trouble-free in operation and which uses an electrical contactor to sense deviations from a normal relation thereof with a conductive program defining means, and wherein an actuator is employed for restoring said contactor to said normal relation upon any deviation from normal at a rate or speed which is proportional to the extent of the deviation.

A further object is to provide a device of this character which is particularly well suited for use with a program defining member constituting a non-conductive member, such as paper, upon which a conductive material, such as a conductive ink, is applied in desired manner, pattern or design to define a desired program, and wherein said device is provided with a novel contactor engaging said program defining member.

A further object is to provide a device of this character utilizing a Wheatstone bridge circuit having two legs which are similarly divided into a plurality of sections and electrically connected to a sensing member having a plurality of contactors symmetrically arranged relative to a central contactor and adapted to engage a conductive program defining element so that a centered relation of the sensing member to the program defining element produces a balance of electrical values in said two bridge legs while an off-center relationship between said sensing member and program defining element short circuits one or more sections of one leg of said bridge to unbalance said bridge circuit.

A further object is to provide a device of this character which is adapted to permit rapid response and accurate following of a sequence or program defining member that is characterized by abrupt changes of direction in either increase or decrease direction.

A further object is to provide a device of this character including a sensing member carrying a plurality of resilient fingers whose terminals lie in predetermined relation to one another in substantially a common plane but are flexible to accommodate variations of the surface contour of the member being contacted.

Other objects will be apparent from the following specification.

In the drawing:

Fig. 1 is a diagrammatic view of the device.

Fig. 2 is a fragmentary face view of the sequence defining and the sensing elements of the device.

Fig. 3 is an enlarged longitudinal sectional view of a part of the device, taken on line 3—3 of Fig. 4.

Fig. 4 is a fragmentary top plan view of a part of the sensing element.

Fig. 5 is an enlarged end view of the sensing element illustrating in cross-section the program defining element engaged thereby.

Referring to the drawing which illustrates the preferred embodiment of the invention, the numeral 10 designates power lines leading from a source of alternating current. These leads are connected with a transformer 12 and with one winding 14 of a reversible electric motor 16. Leads 18 extend from the secondary of the transformer 12 to terminals 20 of a Wheatstone bridge circuit which includes two legs 22 and two legs 24. Each of the legs contains one or more resistances or reactances and, in case of the two legs 24, a plurality of resistances, such as 25, 26 and 27. The resistances or sections 25, 26 and 27 may be of different values, but the similar resistance in each leg is of the same value. Thus resistances 25 in both legs are of the same value; the resistances 26 may be of different value than the resistances 25, but are of the same value in each leg; and the resistances 27 may be different from the resistances 25 and 26, but are of the same value as each other. In other words, each of the legs 24 is a composite of a plurality of sections and is electrically symmetrical to the other leg 24. Terminals 28 at the junctions between the legs 22, 22 and between the legs 24, 24, respectively, are connected by leads 30 to an amplifier 32, and leads 34 from the amplifier are connected with a second coil or winding 36 of the motor 16.

The instrument or device is mounted in a suitable casing (not shown) housing a shiftable member, such as a pivoted arm 38. The construction of this arm is best illustrated in Figs. 3, 4 and 5. The arm may be formed of metal or any other suitable material and, where formed of a conductive material, has fixedly secured thereto at its free end a plate or member 40 formed of a non-conductive material, the same being preferably secured to the arm 38 by securing means, such as the screws 42 shown. The plate 40 preferably has a rib 44 projecting outwardly therefrom and provided with a plurality of passages 46 spaced from each other and adapted to receive flexible elongated wires or conductors 48. The rib 44 is formed in spaced relation to the end portion of the member 40, and a plurality of apertures 50 are formed in the end portion of the member forwardly or outwardly of the rib 44. As best illustrated in Fig. 4, the apertures 50 are arranged in two transverse rows, one aperture 51 being positioned centrally. The aperture in both rows on opposite sides of said central aperture are symmetrically arranged. The spacing between adjacent apertures is preferably uniform, and the apertures in said rows are arranged in staggered relation. This staggered arrangement facilitates the close spacing of the openings transversely of the member without unduly weakening the member. In this connection, in one preferred embodiment of the invention where the contactors 48 are formed of wire .009 inch in diameter, the openings 50 in each row can be spaced apart a distance in the order of .02 inch, and the spacing between an aperture in one row and the adjacent apertures in the other row can be in the order of from .015 inch to .02 inch. It will be understood that these dimensions are illustrative only, and that the invention may be embodied in devices wherein the dimensions vary greatly from those above mentioned. The end portions of the contactors or conductors 48 are bent substantially perpendicularly at 52 to pass through the openings 50 and 51 and project below the member 40 a distance sufficient to engage and contact a surface while the arm 38 is clear of said surface. In other words, the members 52 may project below the member 50 a distance greater than the thickness of the arm 38.

The center conductor which passes through the center opening 51 is connected with the terminal 28 between the bridge legs 24 by a lead 54. The other conductors 48 are connected by leads 56 at different points along the length of the legs 24. Thus the two conductors closest to the center conductor may be connected to the legs 24 between the resistances 26 and 27 of said legs. The next two outwardly disposed conductors may be connected with the bridge legs between the resistances 25 and 26 thereof, and the outermost conductors may be connected with the legs 24 at the terminals 20 or between the same and the resistances 25. The number of leads utilized is optional and, while seven such leads are here shown, it will be understood that the number of leads may be as small as three or may be any larger uneven number found suitable, such as three, five, seven or nine. In one form of the invention, the leads may be integral with the contactors 48, and may constitute sheathed or insulated wires from which the insulation is removed at the terminal portions adjacent to the plastic or non-conductive part 40 to facilitate close spacing of portions 48, 50 and passage thereof through apertures 46, 50, and 51.

The arm 38 is connected with the shaft of the motor 16 to be driven and positioned thereby in any suitable manner, the connection being illustrated diagrammatically in Fig. 1. The instrument mounts a chart juxtaposed to the arm 38 and adapted to be engaged by the terminal portions 52 of the conductors carried by said arm. In the form illustrated a circular chart 58 is employed, being of the type provided with a central opening 59 and adapted for rotation about its center axis by suitable drive means (not shown). It will be understood, however, that any other type of chart, such as a strip chart, may be provided if desired, and that the chart may be stationary and the arm shiftable to traverse said chart and to follow any given path defined thereon. Upon this chart is imprinted, impressed or otherwise applied, a line 60 of conductive material which the arm 38 is to follow, trace or sense. One manner in which such conductive line can be applied to the chart is by the use of a conductive ink, such as a graphite suspension ink.

It will be understood that the motor 16 will have a drive connection, not only with the arm 38, but also with the member or members to be controlled, such as valves, switches, solenoids, relays or the like, and that the relation of the parts will be such that selected parts to be controlled will be actuated or operated at different rotative positions of the motor shaft in the manner well understood in the art.

In the use of the device, the line 60 is applied and laid out upon the chart 58 with reference to time, values, units to be controlled, their sequence and all other variables, and when once calculated can easily be laid out because of the ability to use ink. It will be apparent that this affords a substantial advantage over prior devices of the character using a cam for the same purpose, since it is not necessary to perform any cutting or shaping operations, and the mere drawing of a line upon the chart in proper relation will accomplish the result sought. The arm is positioned upon the chart at the proper starting point so that its center contactor passing through the opening 51 therein engages the line. The width of the line must be at least equal to the lateral component of the spacing between two adjacent contactors. As herein illustrated on Fig. 5, it is preferred that the width of the line be sufficient to permit simultaneous engagement thereof by three contactors. The various elements to be controlled are so oriented with respect to the motor that they occupy the starting position designated by the point of the chart which is engaged by the conductors.

Thereupon the device is set in operation, usually in a manner to cause the chart to be moved at a steady rate so that the time required for the chart to traverse the distance between time designating lins 62 thereof will be exactly equal to the time for which the charts have been calculated. In other words, if the chart is a 24-hour circular chart, it will make exactly one revolution in 24-hours. While the movement of the chart proceeds uniformly, the line 60 may vary in its position upon the chart either as to its position from the center of the chart in the case of a circular chart, or in its position between the side edges of the chart in the case of a strip chart. Where the line bends or curves to such an extent that the normal centered relation of the contactors with reference to the line varies, as electrical unbalance occurs in the system. For example, referring to Fig. 5, if the line should deviate to one side or another with respect to the position illustrated, so that the center contactor and two other contactors on one side thereof are engaged by the line, whereas all contactors on the opposite side of the center contactor engage the paper, an automatic unbalance in the bridge circuit will occur. This unbalance results from the fact that one or more of the resistances 25, 26, 27 in one of the legs 24 is shunted, whereas the same resistances in the other leg 24 remain in circuit. The unbalanced output of the bridge is transmitted through the leads 30 to the amplifier 32 and from the amplifier through the lead 34 to the motor winding 36. It will be apparent, therefore, that the value of the current output from the bridge will vary in a sense and amount corresponding to the departure of the arm 38 from a normal centered position with respect to the line and, when the parts are properly arranged, this departure will energize the winding 36 in a proper manner to correct for this deviation and to actuate the motor in a direction causing movement of the arm toward the center of the line to again restore the bridge to balance. The greater the deviation of the arm from a centered position on the line, the greater will be the unbalance of the bridge and the greater will be the number of resistors 25, 26, 27 which are shunted. Thus the current values will be substantial for large deviations and sufficient to produce rapid operation of the positioning motor 16. As that motor operates, the amount of unbalance will be decreased progressively step-by-step so that an automatic slowing of the motor occurs, and the result is to substantially avoid any hunting or overshooting in the operation of the device. Stated differently, a substantially deadbeat operation of a device of this character can be secured without sacrifice of desired speed of response. The speed of response can further be increased if the value of the various resistances 25, 26, 27 increases progressively in proportion to the spacing of each from the terminal 28 to which the center tap or conductor 54 is connected.

The flexibility of the conductors 48 and their steady mounting and support by the terminal construction of the arm 38 is of considerable importance in devices of this character. Thus the drawing of an ink line upon paper tends to produce a depression in the paper, as best illustrated in Fig. 5, with the inked surface possibly lying slightly below the level of the adjacent surface of the paper of the chart 58. Where the contactors 48 are flexible, as above mentioned, the construction assures contact with both the paper and with the depressed or inset ink line. Thus all contactors engage the chart and no problems arise due to improper action for failure of any contactor to engage either the conductive or non-conductive surface of the chart.

One advantage of the device is the avoidance of the expensive operation of cutting a cam or cam groove for each different pattern or sequence to be established, and the ability to convert the device from control of one sequence to control of another of different character by simply making a drawing of the new sequence and substituting it for the previously used chart. Another advantage is that the spring loading of the follower or sensing member customary in cam-type devices is unnecessary. It is, of course, essential that sufficient pressure be applied upon the arm 38 to insure positive contact of the terminals 52 of each of the contactors 48 with the paper and the ink. It is not necessary, however, that any spring action be applied in a direction transverse to the direction of movement of the chart as in a radial direction in the case of a circular chart. This simplifies the construction of the instant device as compared with a spring loaded device and has the further advantage of permitting accurate and rapid following of abrupt changes, either rising or falling. In cam controlled devices it is possible to spring load a follower only in one direction, and therefore the device is limited to a following or sensing action in one direction but cannot sense or follow rapid or abrupt changes in both directions. The instant device is fully balanced and will operate as rapidly to follow deviations in an increase direction as it will in a decrease direction, and vice versa.

The speed of operation of any follower device of this character depends upon the speed at which the operating motor will swing the follower or sensing member full scale across the chart. The chart speed possible depends in part upon the shape of the line. Thus a chart having a line with gradual rises and falls may rotate more rapidly than one having abrupt rises and falls. Where a very close following of small changes is essential, a fast chart speed is possible to increase sensitivity of the feeling or sensing action if the deviations are small. Slower chart speeds may be required if abrupt bends or rises and falls occur on the chart, in order to maintain a satisfactory rate of response of the device. Under all conditions, however, a rate of response of the instant device can be provided which is equal to or better than the rate of response of devices of the cam follower type.

The invention has been described as applied to a device wherein the chart is driven. However, the application of the invention is not limited to a device of the chart driven type. It may be applied instead to a form of device in which the sensing member is caused to traverse the line and additionally to shift in a lateral direction to follow the bends of the line. Such a device has not been illustrated but its application will be well understood by those skilled in the art. Where dimensions have been stated herein, it will be understood that the same are cited as illustrative and are not intended to be limiting, inasmuch as the size of the device and its various parts may vary as necessary to meet different conditions. Therefore, while the preferred embodiment of the device has been described and illustrated herein, it will be understood that changes may be made in the construction within the scope of the appended claims without departing from the spirit of the invention.

I claim:

1. A program controller comprising a movable chart having a linear conductive program-defining part, a shiftable sensing member having a plurality of contactors engaging said chart and uniformly transversely spaced apart a distance less than the width of said conductive part, a reversible electric motor for shifting said sensing member and the parts to be controlled according to said program, and means controlled by the position of said sensing member relative to the conductive part of said chart for controlling said motor, said means including a normally balanced Wheatstone bridge having two legs each containing a plurality of similar electric resistances, said contactors being connected to said legs between said resistances and an intermediate contactor being connected to the junction between said legs whereby resistances between adjacent contactors engaging the conductive part of said charts are shunted.

2. A program controller comprising a driven chart having a line of conductive ink thereon, a reversible electric motor adapted to actuate parts to be controlled according to a program defined by said line, a shiftable sensing member driven by said motor and having an odd number of equispaced contactors engaging said chart and spaced apart uniformly a distance less than the width of said line, and means controlled by said sensing member for controlling said motor, including a bridge circuit and leads connecting each contactor with a different part of said bridge circuit, the central contactor being connected to said bridge between adjacent legs and the remaining contactors being connected at electrically spaced parts of said legs.

3. A program controller comprising a shiftable chart having a line of conductive ink thereon, a reversible electric motor adapted to actuate parts to be controlled according to a program defined by said line, a shiftable sensing member driven by said motor and having an odd number of equispaced contactors engaging said chart and spaced apart uniformly a distance less than the width of said line, and means controlled by said sensing member for controlling said motor, including a bridge circuit and leads connecting each contactor with a different part of said bridge circuit, the central contactor being connected to said bridge between adjacent legs and the remaining contactors being connected at electrically spaced parts of said adjacent legs, each of said contactors comprising an elongated resilient conductor having a laterally projecting terminal portion, and means supporting said conductors spaced from the terminal portions thereof.

4. A program controller comprising a shiftable chart having a line of conductive ink thereon, a reversible electric motor adapted to actuate parts to be controlled according to a program defined by said line, a shiftable sensing member driven by said motor and having an odd number of equi-spaced contactors engaging said chart and spaced apart uniformly a distance less than the width of said line, and means controlled by said sensing member for controlling said motor, including a bridge circuit and leads connecting each contactor with a different part of said bridge circuit, the central contactor being connected to said bridge between adjacent legs and the remaining contactors being connected at electrically spaced parts of said adjacent legs, said sensing member including a rigid part substantially parallel to said chart and having passages therethrough adjacent its free end, said contactors comprising resilient elongated conductors extending substantially parallel to said part and having laterally projecting terminal portions extending through said passages, and means carried by said part for securing said conductors thereto spaced from said terminal portions.

5. A program controller comprising a driven chart having a line of conductive ink thereon, a reversible electric motor adapted to actuate parts to be controlled according to a program defined by said line, a shiftable sensing member driven by said motor and having an odd number of equi-spaced contactors engaging said chart and spaced apart uniformly a distance less than the width of said line, and means controlled by said sensing member for controlling said motor, including a bridge circuit and leads connecting each contactor with a different part of said bridge circuit, the central contactor being connected to said bridge between adjacent legs and the remaining contactors being connected at electrically spaced parts of said adjacent legs, said sensing member including a rigid non-conductive part having a plurality of openings therein whose axes extend angularly relative to the plane of said chart, said contactors each constituting an elongated resilient conductor anchored to said non-conductive part spaced from said openings and having a laterally projecting terminal portion extending through one of said openings for engagement of its end with said chart.

6. A program controller comprising a Wheatstone bridge, a reversible motor responsive to unbalance of said bridge, a sensing member positioned by said motor, and a chart of non-conductive material carrying a linear conductive program-defining portion, said bridge having a pair of legs each having a plurality of resistances therein, said sensing member having a plurality of contactors arranged in a substantially linear set extending crosswise of said linear conductive portion and of a length greater than the width of said linear conductive portion and adapted to shunt at least one bridge resistance as selected by the motor responsive to bridge balance in all operative positions thereof, said chart and sensing member being relatively shiftable at a predetermined timed rate.

7. A program controller comprising a Wheatstone bridge, a reversible motor responsive to unbalance of said bridge, a sensing member positioned by said motor, and a chart of non-conductive material carrying a linear conductive program-defining portion, said bridge having a pair of legs each having a plurality of resistances therein, said sensing member having a plurality of contactors and adapted to shunt at least one bridge resistance in all operative positions thereof, said chart and sensing member being relatively shiftable at a predetermined timed rate, one of said contactors being centrally positioned and connected to said bridge between the legs thereof, the other contactors being symmetrically arranged relative to said central contactor and being connected to said bridge legs in electrical symmetry.

8. A program controller comprising a Wheatstone bridge, a reversible motor responsible to unbalance of said bridge, a sensing member positioned by said motor, and a chart of non-conductive material carrying a linear conductive program-defining portion, said bridge having a pair of legs each having a plurality of resistances therein, said sensing member having a plurality of contactors and adapted to shunt at least one bridge resistance in all operative positions thereof, said chart and sensing member being relatively shiftable at a predetermined timed rate, said contactors being spaced apart uniformly in a direction transverse of the path of said shiftable member a distance not greater than one-half of the width of said linear conductive portion.

9. A program controller comprising a Wheatstone bridge, a reversible motor responsive to unbalance of said bridge, a non-conductive program controlling member having a linear conductive portion, a sensing member positioned by said motor and mounting a plurality of contactors engageable with the controller and spaced apart uniformly a distance less than the width of said linear portion, one of said members being shiftable relative to the other at a uniform rate, said contactors being connected to said bridge to provide a normal balanced condition of said bridge when said sensing member is centered relative to said conductive part and to unbalance said bridge step-by-step as said members progressively deviate from said centered relation.

10. A program controller comprising a Wheatstone bridge, a reversible motor responsive to unbalance of said bridge, a non-conductive program controlling member having a linear conductive portion, a sensing member positioned by said motor and mounting a plurality of contactors engageable with the controller and spaced apart uniformly a distance less than the width of said linear portion, one of said members being shiftable relative to the other at a uniform rate, said contactors being connected to said bridge to provide a normal balanced condition of said bridge when said sensing member is centered relative to said conductive part and to unbalance said bridge step-by-step as said members progressively deviate from said centered relation, said contactors being so spaced relative to the width of said linear conductive portion that three thereof engage said conductive portion when said members are in said centered relation.

11. A line tracer adapted to engage a chart having a line of conductive ink thereon, comprising an arm having a plurality of uniformly spaced apertures therein adjacent its end, a plurality of elongated flexible conductors, a transverse projection carried by said arm spaced from said apertures and having a plurality of spaced passages formed transversely therein, each conductor extending through a passage and having a bend spaced from its end and from said projection, the end portion of each conductor extending through one of said apertures with a sliding guided fit.

12. A line tracer adapted to engage a non-conductive member having a linear conductive portion substantially flush therewith, comprising a shiftable member, a non-conductive member fixedly secured to said first member and having a plurality of apertures formed therein adjacent to its end and spaced apart a distance less than the width of said conductive portion, a plurality of flexible sheathed conductors supported and positioned in predetermined relation to said members spaced from said apertures, said conductors each having a bend adjacent its end, at least the portion of said conductors outwardly from said bend being bared and extending through an aperture with a guided slide fit.

13. A line tracer adapted to engage a non-conductive member having a linear conductive portion substantially flush therewith, comprising a shiftable member, a non-conductive member fixedly secured to said first member and having a plurality of apertures formed therein adjacent to its end and spaced apart a distance less than the width of said conductive portion, a plurality of flexible sheathed conductors supported and positioned in predetermined relation to said members spaced from said aperture, said conductors each having a bend adjacent its end, at least the portion of said conductors outwardly from said bend being bared and extending through an aperture with a guided slide fit, said apertures being arranged in two rows, said apertures being uniformly spaced with the space between said rows and the spacing of said apertures in each row less than the width of said conductive linear portion.

14. In combination, a non-conductive member bearing a conductive linear material and adapted to be moved at a uniform rate, a line tracer shiftable to follow said line, a Wheatstone bridge circuit having a pair of electrically symmetrical legs each formed of a plurality of sections, and a plurality of contactors of odd number carried by said tracer and uniformly spaced apart, the spacing between adjacent contactors in a direction transverse of said linear material being not greater than one-half the width of said linear material, the central contactor being connected to said bridge between said legs and each group of contactors at one side of said central contactor being connected with one of said sectional legs at different points thereof and between said sections.

15. A program controller comprising a Wheatstone bridge, a reversible motor responsive to unbalance of said bridge, a sensing member positioned by said motor and having an elongated head having a plurality of electrical contactors spaced lengthwise thereof, and a chart of non-conductive material carrying a linear conductive program-defining portion narrower than said head and engaged by some of the contactors of said sensing member, the relation between said sensing member and linear conductive chart portion controlling the electrical output of said bridge.

16. A program controller comprising a Wheatstone bridge, a reversible motor responsive to unbalance of said bridge, a sensing member positioned by said motor, and a chart of non-conductive material carrying a linear conductive program-defining portion engaged by said sensing member to electrically shunt a portion of said bridge to control the output of said bridge, said sensing member being wider than said program-defining linear portion whereby only a portion of said sensing member can contact said program-defining portion at one time.

GEORGE B. BAILEY.

REFERENCES CITED

The following references are of record in the file of this patent:

UNITED STATES PATENTS

| Number | Name | Date |
|---|---|---|
| 2,014,825 | Watson | Sept. 17, 1935 |
| 2,354,391 | McCourt | July 25, 1944 |
| 2,414,685 | Alexanderson et al. | Jan. 21, 1947 |